US010931968B2

(12) United States Patent
Ahonen et al.

(10) Patent No.: US 10,931,968 B2
(45) Date of Patent: Feb. 23, 2021

(54) METHOD AND APPARATUS FOR ENCODING OR DECODING VIDEO CONTENT INCLUDING REGIONS HAVING LOOPING VIDEOS OF DIFFERENT LOOP LENGTHS

(71) Applicant: Nokia Technologies Oy, Espoo (FI)

(72) Inventors: Timo Juhani Ahonen, Redwood City, CA (US); Daniel Andre Vaquero, Sunnyvale, CA (US); Miska Matias Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/664,847

(22) Filed: Jul. 31, 2017

(65) Prior Publication Data

US 2019/0037234 A1    Jan. 31, 2019

(51) Int. Cl.
*H04N 19/543* (2014.01)
*H04N 19/179* (2014.01)
(Continued)

(52) U.S. Cl.
CPC ......... *H04N 19/543* (2014.11); *H04N 19/105* (2014.11); *H04N 19/132* (2014.11); *H04N 19/136* (2014.11); *H04N 19/17* (2014.11); *H04N 19/179* (2014.11); *H04N 19/23* (2014.11); *H04N 19/46* (2014.11); *H04N 19/503* (2014.11); *H04N 19/563* (2014.11);
(Continued)

(58) Field of Classification Search
CPC ..... H04N 19/543; H04N 19/59; H04N 19/179

USPC .................................................... 375/240.16
See application file for complete search history.

(56) References Cited

U.S. PATENT DOCUMENTS 5,982,440 A * 11/1999 Aoki ..................... H04N 19/577
                                                                  348/699
6,263,496 B1    7/2001 Meyer et al.
(Continued)

OTHER PUBLICATIONS

Greenberg, J. et al. "Real Time 3D Animation Using Progressive Transmission." Proceedings of the 1999 IEEE Canadian Conference on Electrical and Computer Engineering; Shaw Conference Center, Edmonton, Alberta, Canada, May 9-12, 1999; pp. 775-780.
(Continued)

*Primary Examiner* — Jamie J Atala
*Assistant Examiner* — Kathleen V Nguyen
(74) *Attorney, Agent, or Firm* — Alston & Bird LLP

(57) ABSTRACT

A method, apparatus and computer program product are provided in order to create and/or decode video content of a scene that includes regions having looping video of different loop lengths with the video content of the scene being configured to be repeatedly looped, such as in the form of a cinemagraph, without any temporal discontinuity. In the context of a method, the video content of a scene is encoded. The video content includes at least two regions having looping videos of different loop lengths. The method also includes constructing metadata in association with the video content. The metadata comprises information identifying a location of each region within the scene. The metadata further comprises a loop length for each of the at least two regions. The method further includes causing provision of the video content as encoded and the metadata.

26 Claims, 6 Drawing Sheets

(51) Int. Cl.

| | | |
|---|---|---|
| *H04N 19/563* | (2014.01) | |
| *H04N 19/59* | (2014.01) | |
| *H04N 19/503* | (2014.01) | |
| *H04N 19/46* | (2014.01) | |
| *H04N 19/70* | (2014.01) | |
| *H04N 19/17* | (2014.01) | |
| *H04N 19/105* | (2014.01) | |
| *H04N 19/58* | (2014.01) | |
| *H04N 19/136* | (2014.01) | |
| *H04N 19/132* | (2014.01) | |
| *H04N 19/23* | (2014.01) | |
| H04N 19/167 | (2014.01) | |
| H04N 21/234 | (2011.01) | |
| H04N 19/27 | (2014.01) | |
| H04N 19/587 | (2014.01) | |
| H04N 21/44 | (2011.01) | |

(52) U.S. Cl.
CPC ............ *H04N 19/58* (2014.11); *H04N 19/59* (2014.11); *H04N 19/70* (2014.11); *H04N 19/167* (2014.11); *H04N 19/27* (2014.11); *H04N 19/587* (2014.11); *H04N 21/23412* (2013.01); *H04N 21/44012* (2013.01)

(56) References Cited

U.S. PATENT DOCUMENTS

| | | | |
|---|---|---|---|
| 6,600,835 | B1 | 7/2003 | Ishikawa |
| 7,523,474 | B2 | 4/2009 | Herley |
| 8,301,669 | B2 | 10/2012 | O'Brien-Strain et al. |
| 8,345,983 | B2 | 1/2013 | Noguchi et al. |
| 9,374,449 | B2 | 6/2016 | Kim et al. |
| 9,547,927 | B2 | 1/2017 | Hoppe et al. |
| 2003/0202698 | A1* | 10/2003 | Simard .................. G06T 5/005 382/195 |
| 2004/0015491 | A1 | 1/2004 | Brown et al. |
| 2011/0304642 | A1* | 12/2011 | Coupe .................. G06F 3/14 345/592 |
| 2013/0038613 | A1* | 2/2013 | Kim .................. H04M 1/72555 345/473 |
| 2013/0202194 | A1* | 8/2013 | Graziosi ................. G06T 3/403 382/154 |
| 2016/0275714 | A1* | 9/2016 | Hoppe .................... G06F 3/048 |
| 2017/0062006 | A1* | 3/2017 | Plom .................... G11B 27/007 |
| 2017/0098464 | A1* | 4/2017 | Wang .................... G11B 27/007 |
| 2018/0152662 | A1* | 5/2018 | Takahashi ............ H04N 9/8042 |

OTHER PUBLICATIONS

Kwak, et al. "Generalized Background Subtraction Based on Hybrid Inference by Belief Propagation and Bayesian Filtering." 2011 International Conference on Computer Vision, 8 pages.

Liao, et al. "Automated Video Looping with Progressive Dynamism" ACM Transactions on Graphics—SIGGRAPH: 2013 Conference Proceedings, vol. 32, Issue 4, Article 77 (Jul. 2013), 10 pages.

Meyer, et al. "Phase-Based Frame Interpolation for Video." IEEE Conference on Computer Vision and Pattern Recognition (Jun. 8, 2015), 9 pages.

Niklaus, et al. "Video Frame Interpolation via Adaptive Convolution." IEEE Conference on Computer Vision and Pattern Recognition (2017).

Stafford, Dave. "Sony Vegas 11—exact settings to upload a 1080p HD video to Youtube." [retrieved May 11, 2017]. Retrieved from the Internet: <URL: https://forums.creativecow.net/thread/24/932440>. (dated Jul. 6, 2011) 5 pages.

Tompkin, et al. "Towards Moment Imagery: Automatic Cinemagraphs." 2011 Conference for Visual Media Production, 7 pages.

Qi Liu et al., "Function-defined shape metamorphoses in VRML", Computer Graphics and Interactive Techniques in Australasia and South East Asia, ACM, 2 Penn Plaza, Suite 701 New York NY 10121-0701 USA, (Nov. 29, 2005).

Schneider D K et al, "VRML Primer and Tutorial", Internet Citation, (Mar. 18, 1998), URL: http://tecfa.unige.ch/guides/vrml/vrmlman/vrmlman.pdf, (Nov. 16, 2006), XP007901343 [A] 1-21 * Chapter "4 Mixing HTML with VRML"; Subsection "4.1 Introduction" * * Chapter "5 Introduction to moving, interactive VRML", pp. 49-64.

Doenges P K et al, "Audio/video and synthetic graphics/audio for mixed media", Signal Processing, Image Communication, Elsevier Science Publishers, Amsterdam, NL, (May 1, 1997), vol. 9, No. 4, ISSN 0923-5965, pp. 433-463.

* cited by examiner

METHOD AND APPARATUS FOR ENCODING OR DECODING VIDEO CONTENT INCLUDING REGIONS HAVING LOOPING VIDEOS OF DIFFERENT LOOP LENGTHS

TECHNOLOGICAL FIELD

An example embodiment relates generally to encoding or decoding video content and, more particularly, to encoding or decoding video content including regions having looping videos of different loop lengths.

BACKGROUND

The video content of a scene, such as a scene having a relatively large field of view, e.g., a planar projection of a 360° video, may be repeatedly replayed in a loop, such as in the form of a cinemagraph. In some instances, the video content of the scene includes two or more regions with each region represented by a looping video having a different loop length. As such, the display of the video content results in the looping videos being repeatedly presented within the respective regions of the scene. By way of example, FIG. 1 depicts a scene 10 that includes three regions, namely, Region 0, Region 1 and Region 2 designated 12, 14 and 16, respectively. As shown in FIG. 1, Region 0 is the background of the scene, which is static. Region 1, however, depicts foliage that moves in the wind in such a manner as to be represented by a looping video having a length of 3.5 seconds. Similarly, Region 2 represents moving water and is represented by a looping video having a loop length of 2.1 seconds.

In order to create a looping video of the video content of the scene, that is, to create a cinemagraph of the scene, the total video length of the looping video of the scene may be determined such that the loop lengths of the looping videos of the different regions are in alignment at the beginning and end of the looping video. With reference to the scene of FIG. 1, the looping videos of the regions may be repeatedly played until the looping videos of the regions within the scene are aligned following 10.5 seconds as shown in FIG. 2. As illustrated by this example, the total video length of a scene including regions having looping videos of different loop lengths is the least common multiple of the loop lengths of the looping videos of the different regions. Thus, in order to represent the scene for purposes of a cinemagraph, the video content over the total video length, such as 10.5 seconds in the foregoing example, must be defined and, in instances in which the video content of the scene is to be transmitted to another location for storage, display or the like, the video content of the scene having the total video length must be encoded, transmitted and subsequently decoded. Thereafter, the video content of the scene may be presented in the form of a looping video or cinemagraph that is repeated for the total video length of each loop, such as 10.5 seconds in the foregoing example.

While video content of a scene having a total video length of 10.5 seconds may be encoded, transmitted and decoded without the consumption of an excessive amount of processing resources, the total video length of some scenes may become substantially longer and, as a result, be much less efficient in order to encode, transmit and decode as a result of the requirement for the consumption of substantial processing resources. For example, the total video length may increase due to the time required in order for the loop lengths of the looping videos of the different regions to align and/or because the loop lengths of one or more of the looping videos of the different regions are much longer than those in the foregoing example. In this regard, the total video length may be significantly extended in order to align the loop lengths of the looping videos of the different regions in instances in which the scene includes a larger number of regions having looping videos with different loop lengths. By way of example, the video content of a scene may include five regions having five different, but relatively short, loop lengths of 1.7 seconds, 4.9 seconds, 5.1 seconds, 6.3 seconds and 6.5 seconds. In this example, the shortest total video length at which the loop lengths of the looping videos of the different regions align is 48,730.5 seconds, which is about 13.5 hours. The encoding of video content of a scene having a total video length of this length becomes prohibitively time consuming and processing intensive.

The alignment issues between the looping videos of the different regions becomes even more complex and, in some instances, impossible in instances in which the looping videos are not aligned at the initial time t=0. As shown in FIG. 3, for example, one region may include introductory, non-looping video content that begins at the initial time and is followed by the looping video for the respective region. In contrast, the looping video for the other region(s) within the scene begins at the initial time. In an instance in which looping videos of both regions have the same loop length, such as 2 seconds, the insertion of introductory content in one of the regions having a length different than the loop length of the looping videos prevents the looping videos of the first and second regions from ever being aligned, no matter how many times the looping videos are repeated. In general terms, in an instance in which the introductory content presented in one of the regions at the initial time t=0 extends for c seconds and the loop lengths of the looping videos for the first and second regions are a and b, respectively, the looping videos for the first and second regions are aligned at a subsequent point in time if and only if the Diophantine equation $ax+by=c$ has integer solutions x and y. In other words, the looping videos of the first and second regions are aligned at a later point in time if and only if c is a multiple of the greatest common divisor of a and b. As such, the encoding, transmission and decoding of video content of a scene to be repeatedly presented in a loop, such as in the form of a cinemagraph, which includes regions having looping videos of different loop lengths may become prohibitively large in terms of the time and processing resources required to encode, transmit and decode the video content in instances in which the total video length is extended.

In order to reduce the total video length and, in turn, to reduce the processing resources required to encode, store, transmit and/or decode the video content of a scene, the total video length of the video content of a scene has been forcibly limited by assigning an unnatural loop length for the looping video of at least one of the regions. In this regard, by assigning a different loop length (that is, a different loop length than the time otherwise required to replay the entire looping video) for at least one iteration of the looping video of one of the regions, such as by truncating one iteration of the looping video of one region, the looping videos of the different regions may be more quickly aligned, thereby reducing the total video length and correspondingly reducing the video content of the scene that must be encoded, stored, transmitted and decoded. However, the unnatural loop length of the looping video in one of the regions generally causes the resulting video content of the scene to appear unnatural and, in some instances, to suffer from temporal discontinuities, thereby reducing the overall user experience.

BRIEF SUMMARY

A method, apparatus and computer program product are provided in accordance with an example embodiment in order to create and/or decode video content of a scene that includes regions having looping video of different loop lengths with the video content of the scene being configured to be repeatedly looped, such as in the form of a cinemagraph, without any temporal discontinuity. In this regard, the method, apparatus and computer program product of an example embodiment are configured to create the video content of the scene in such a manner that video content is not prohibitively large and, as a result, may be relatively efficiently encoded, transmitted and decoded while conserving the processing resources required therefore. Moreover, by constructing the video content of the scene in accordance with an example embodiment of the present disclosure, the resulting display of the video content, such as in a repeated loop in the form of a cinemagraph, causes the video content of the scene to appear natural and temporally continuous, thereby resulting in an improved user experience without undesirably consuming excessive processing resources for the encoding, transmission and decoding of the video content of the scene.

In an example embodiment, a method is provided that includes encoding video content of a scene. The video content includes at least two regions having looping videos of different loop lengths. The method also includes constructing metadata in association with the video content. The metadata comprises information identifying a location of each of the at least two regions within the scene. The metadata further comprises a loop length for each of the at least two regions. The method further includes causing provision of the video content as encoded and the metadata.

The method of an example embodiment also includes padding a first video content associated with a first region of the at least two regions of the video content with additional video content. The additional video content is such that an aggregate loop length of the first video content and the additional video content is at least as long as a loop length of a second video content of a second region of the at least two regions of the video content. A loop length of the first video content is shorter than the loop length of the second video content. In this example embodiment, the method may pad the first video content by adding additional video content in a form of video interpolation to the first video content of the first region having the shorter loop length. In an example embodiment, the method encodes the video content such that only a single loop of each of the at least two regions having looping videos is encoded. The method of an example embodiment also includes padding a second video content associated with a second region of the at least two regions of the video content with additional video content. A loop length of the second video content is longer than a loop length of a first video content of a first region of the at least two regions of the video content. In this example embodiment, the method may pad the second video content by adding additional video content in the form of video interpolation to the second video content of the second region having the longer loop length.

In another example embodiment, an apparatus is provided that includes at least one processor and at least one memory including computer program code with at least one memory and the computer program code configured to, with the processor, cause the apparatus to at least encode video content of a scene. The video content includes at least two regions having looping videos of different loop lengths. The at least one memory and the computer program code are also configured to, with the processor, cause the apparatus to construct metadata in association with the video content. The metadata comprises information identifying a location of each of the at least two regions within a scene. The metadata also comprises a loop length for each of the at least two regions. The at least one memory and the computer program code are further configured to, with the processor, cause the apparatus to cause provision of the video content as encoded and the metadata.

The at least one memory and the computer program code are configured to, with the processor, cause the apparatus of an example embodiment to pad a first video content associated with a first region of the at least two regions of the video content with additional video content. The additional video content is such that an aggregate loop length of the first video content and the additional video content is at least as long as a loop length of a second video content of a second region of the at least two regions of the video content. A loop length of the first video content is shorter than the loop length of the second video content. In this example embodiment, the at least one memory and the computer program code are configured to, with the processor, cause the apparatus to pad the first video content by adding additional video content in the form of a video interpolation to the first video content of the first region having the shorter loop length. The at least one memory and the computer program code are configured to, with the processor, cause the apparatus of an example embodiment to encode video content by encoding only a single loop of each of the at least two regions having looping videos. The at least one memory and the computer program code are configured to, with the processor, cause the apparatus of an example embodiment to pad a second video content associated with a second region of the at least two regions of the video content with additional video content. A loop length of the second video content is longer than a loop length of a first video content of a first region of the at least two regions of the video content. In this example embodiment, the at least one memory and the computer program code are configured to, with the processor, cause the apparatus to pad the second video content by adding additional video content in the form of video interpolation to the second video content of the second region having the longer loop length.

In a further embodiment, a computer program product is provided that includes at least one non-transitory computer readable storage medium having computer-executable program code portions stored therein with the computer-executable program code portions including program code instructions configured to encode video content of a scene. The video content includes at least two regions having looping videos of different loop lengths. The program code portions also include program code instructions configured to construct metadata in association with the video content. The metadata comprises information identifying a location of each of the at least two regions within the scene. The metadata further comprises a loop length for each of the at least two regions. The program code portions further include program code instructions configured to cause provision of the video content as encoded and the metadata.

The program code portions of an example embodiment also include program code instructions configured to pad a first video content associated with a first region of the at least two regions of the video content with additional video content. The additional video content is such that an aggregate loop length of the first video content and the additional video content is at least as long as a loop length of a second video content of a second region of the at least two regions of the video content. A loop length of the first video content is shorter than the loop length of the second video content. The program code instructions configured to pad the first video content may include program code instructions configured to add additional video content in the form of video interpolation to the first video content of the first region having the shorter loop length. The program code instructions configured to encode video content may include program code instructions configured to encode only a single loop of each of the at least two regions having looping videos. The program code instructions of an example embodiment also include program code instructions configured to pad a second video content associated with a second region of the at least two regions of the video content with additional video content. A loop length of the second video content is longer than a loop length of a first video content of a first region of the at least two regions of the video content. In this example embodiment, the program code instructions configured to pad the second video content may include program code instructions configured to add additional video content in the form of video interpolation to the second video content of the second region having the longer loop length.

In yet another example embodiment, an apparatus is provided that includes means for encoding the video content of a scene. The video content includes at least two regions having looping videos of different loop lengths. The apparatus also includes means for constructing metadata in association with the video content. Metadata includes information identifying a location of each of the at least two regions within the scene. The metadata further includes a loop length for each of the at least two regions. The apparatus further includes means for causing provisions of the video content as encoded and the metadata.

The apparatus of an example embodiment also includes means for padding a first video content associated with a first region of the at least two regions of the video content with additional video content. The additional video content is such that an aggregate loop length of the first video content and the additional video content is at least as long as a loop length of a second video content of a second region of the at least two regions of the video content. A loop length of the first video content is shorter than the loop length of the second video content. In this example embodiment, the means for padding the first video content may include means for adding additional video content in the form of video interpolation to the first video content of the first region having the shorter loop length. In an example embodiment, the means for encoding video content includes means for encoding only a single loop of each of the at least two regions having looping videos. The apparatus of an example embodiment also includes means for padding a second video content associated with a second region of the at least two regions of the video content with additional video content. A loop length of the second video content is longer than a loop length of a first video content of a first region of the at least two regions of the video content. In this example embodiment, the means for padding the second video content may include means for adding additional video content in the form of video interpolation to the second video content of the second region having the longer loop length.

In an example embodiment, the method is provided that includes decoding video content of a scene. The video content includes at least two regions having looping videos of different loop lengths. The method also includes interpreting metadata associated with the video content to identify information identifying the location of each region within the scene and to identify the loop length of the looping videos for each of the at least two regions. The method further includes causing the video content as decoded to be presented with each region positioned within the scene at the location identified by the metadata. In this regard, the method causes the video content to be presented by causing the looping video of each region to be repeatedly presented.

In an example embodiment, the method decodes video content by decoding additional video content in the form of video interpolation that pads a first video content of a first region of the at least two regions of the video content. As such, an aggregate loop length of the first video content and the additional video content is at least as long as a loop length of a second video content of a region of the at least two regions of the video content. A loop length of the first video content is shorter than the loop length of the second video content. The method of this example embodiment also causes the video content to be presented by causing a combination of the looping video of the first region having the shorter loop length and the additional video content to be repeatedly presented. The video content of an example embodiment includes only a single loop of each of the at least two regions having looping videos. In an example embodiment, the method decodes video content by decoding additional video content in the form of video interpolation that pads a second video content of a second region of the at least two regions of the video content. A loop length of the second video content is longer than a loop length of a first video content of a first region of the at least two regions of the video content. The method of this example embodiment also causes the video content to be presented by causing a combination of the looping video of the second region having the longer loop length and the additional video content to be repeatedly presented.

In another example embodiment, an apparatus is provided that includes at least one processor and at least one memory including computer program code with the at least one memory and the computer program code configured to, with the processor, cause the apparatus to at least decode video content of a scene. The video content includes at least two regions having looping videos of different loop lengths. The at least one memory and the computer program code are also configured to, with the processor, cause the apparatus to interpret metadata associated with the video content to identify information identifying a location of each region within the scene and to identify the loop length of the looping videos for each of the at least two regions. The at least one memory and the computer program code are further configured to, with the processor, cause the apparatus to cause the video content as decoded to be presented with each region positioned within the scene at the location identified by the metadata. The at least one memory and the computer program code are configured to, with the processor, cause the apparatus to cause the video content to be presented by causing the looping video of each region to be repeatedly presented.

The at least one memory and the computer program code are configured to, with the processor, cause the apparatus of an example embodiment to decode video content by decoding additional video content in the form of video interpolation that pads a first video content of a first region of the at least two regions of the video content. As such, an aggregate loop length of the first video content and the additional video content is at least as long as a loop length of a second video content of a region of the at least two regions of the video content. A loop length of the first video content is shorter than the loop length of the second video content. The at least one memory and the computer program code are also configured to, with the processor, cause the apparatus of this example embodiment to cause the video content to be presented by causing a combination of the looping video of the first region having the shorter loop length and the additional video content to be repeatedly presented. In an example embodiment, the video content includes only a single loop of each of the at least two regions having looping videos. The at least one memory and the computer program code are configured to, with the processor, cause the apparatus of an example embodiment to decode the video content by decoding additional video content in the form of video interpolation that pads a second video content of a second region of the at least two regions of the video content, wherein a loop length of the second video content is longer than a loop length of a first video content of a first region of the at least two regions of the video content. The at least one memory and the computer program code are configured to, with the processor, cause the apparatus of this example embodiment to cause the video content to be presented by causing a combination of the looping video of the second region having the longer loop length and the additional video content to be repeatedly presented.

In a further example embodiment, a computer program product is provided that includes at least one non-transitory computer-readable storage medium having computer-executable program code portions stored therein with the computer-executable program code portions comprising program code instructions configured to decode video content of a scene. The video content includes at least two regions having looping videos of different loop lengths. The program code portions also include program code instructions configured to interpret metadata associated with the video content to identify information identifying a location of each region within the scene and to identify the loop length of each of the at least two regions. The program code portions further include program code instructions configured to cause the video content as decoded to be presented with each region positioned within the scene at the location identified by the metadata. The program code instructions configured to cause video content to be presented include program code instructions configured to cause the looping video of each region to be repeatedly presented.

In an example embodiment, the program code instructions configured to decode video content include program code instructions configured to decode additional video content in the form of video interpolation that pads a first video content of a first region of the at least two regions of the video content. As such, an aggregate loop length of the first video content and the additional video content is at least as long as a loop length of a second video content of a region of the at least two regions of the video content. A loop length of the first video content is shorter than the loop length of the second video content. In this example embodiment, the program code instructions configured to cause the video content to be presented include program code instructions configured to cause the combination of the looping video of the first region having the shorter loop length and the additional video content to be repeatedly presented. In an example embodiment, the video content includes only a single loop of each of the at least two regions having looping videos. In an example embodiment, the program code instructions configured to decode video content include program code instructions configured to decode additional video content in the form of video interpolation that pads a second video content of a second region of the at least two regions of the video content, wherein a loop length of the second video content is longer than a loop length of a first video content of a first region of the at least two regions of the video content. In this example embodiment, the program code instructions configured to cause the video content to be presented include program code instructions configured to cause the combination of the looping video of the second region having the longer loop length and the additional video content to be repeatedly presented.

In yet another example embodiment, an apparatus is provided that includes means for decoding video content of a scene. The video content includes at least two regions having looping videos of different loop lengths. The apparatus also includes means for interpreting metadata associated with the video content to identify information identifying the location of each region within the scene and to identify the loop length of the looping video for each of the at least two regions. The apparatus of this example embodiment also includes means for causing the video content as decoded to be presented with each region positioned within the scene at the location identified by the metadata. The means for causing the video content to be presented includes means for causing looping video of each region to be repeatedly presented.

In an example embodiment, the means for decoding video content includes means for decoding additional video content in the form of video interpolation that pads a first video content of a first region of the at least two regions of the video content. As such, an aggregate loop length of the first video content and the additional video content is at least as long as a loop length of a second video content of a region of the at least two regions of the video content. A loop length of the first video content is shorter than the loop length of the second video content. In this example embodiment, the means for causing the video content to be presented includes means for causing a combination of the looping video of the first region having the shorter loop length and the additional video content to be repeatedly presented. In an example embodiment, the video content includes only a single loop of each of the at least two regions having looping videos. In an example embodiment, the means for decoding video content includes means for decoding additional video content in the form of video interpolation that pads a second video content of a second region of the at least two regions of the video content, wherein a loop length of the second video content is longer than a loop length of a first video content of a first region of the at least two regions of the video content. In this example embodiment, the means for causing the video content to be presented includes means for causing a combination of the looping video of the second region having the longer loop length and the additional video content to be repeatedly presented.

BRIEF DESCRIPTION OF THE DRAWINGS

Figures 1, 2:
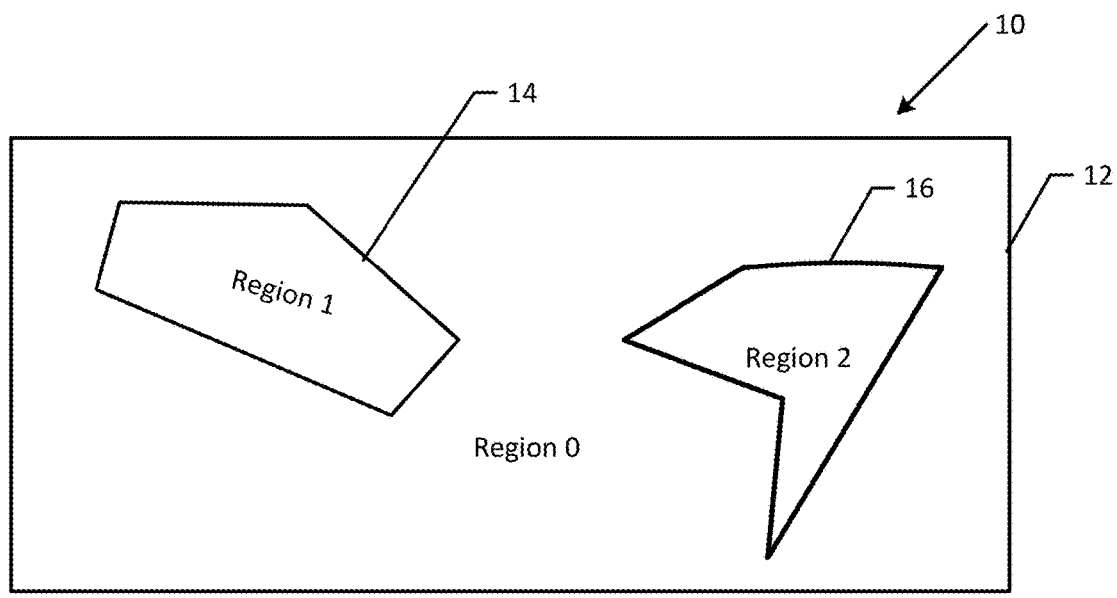
Figure 3:
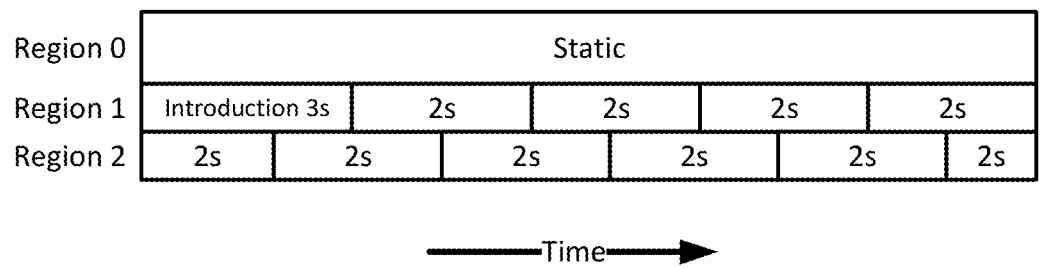
Figure 4:
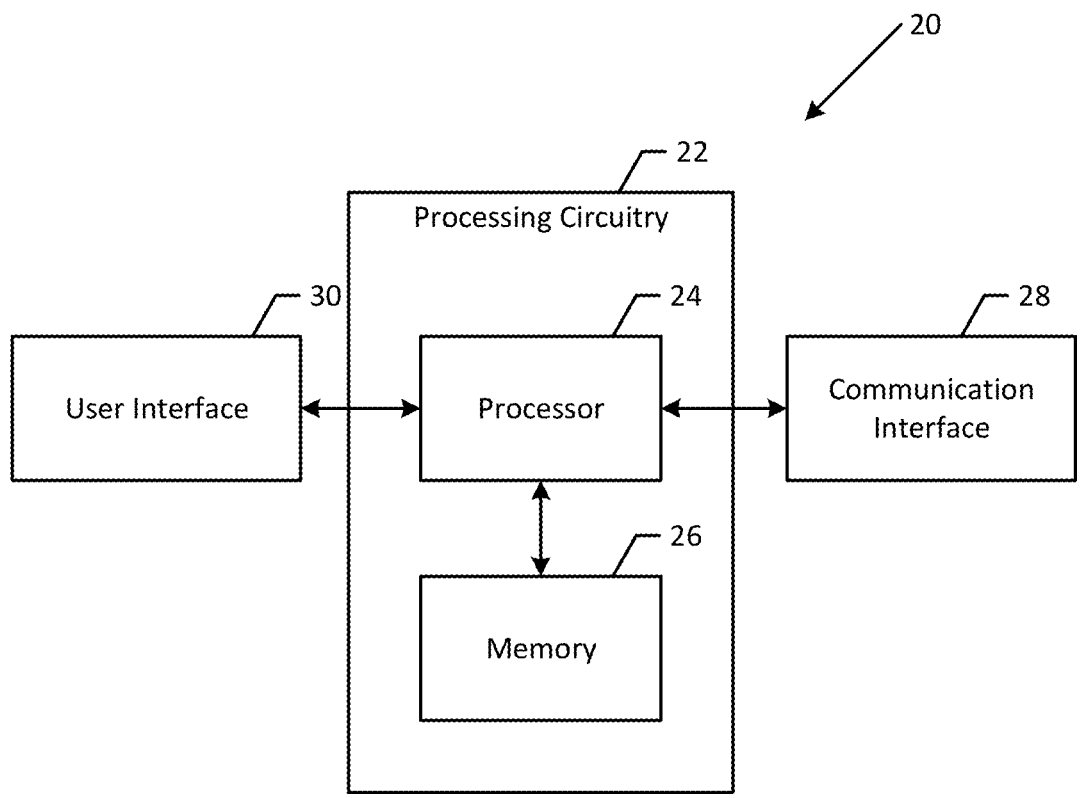
Figure 5:
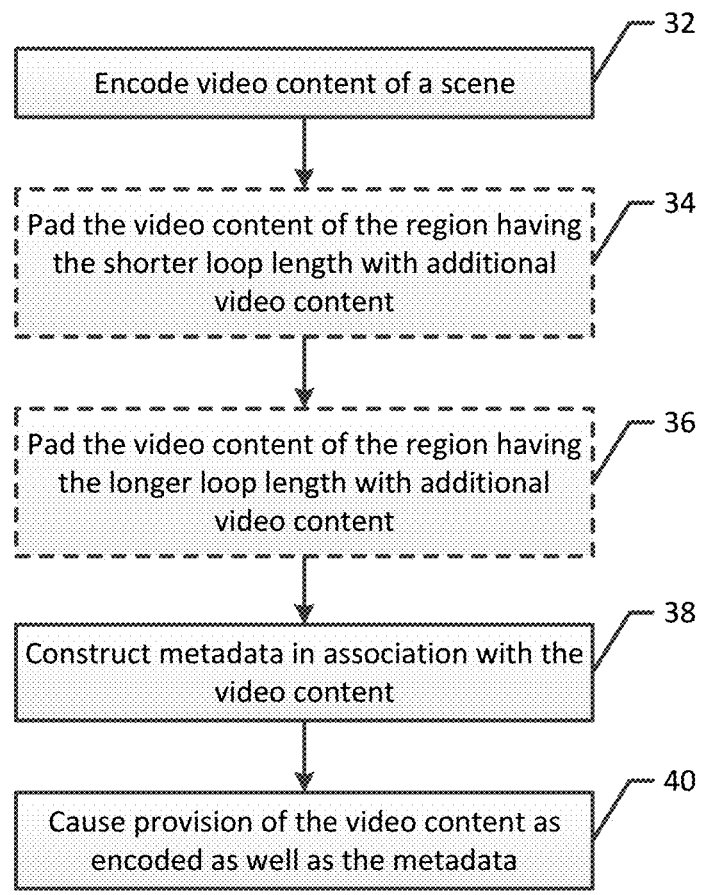
Figure 6:
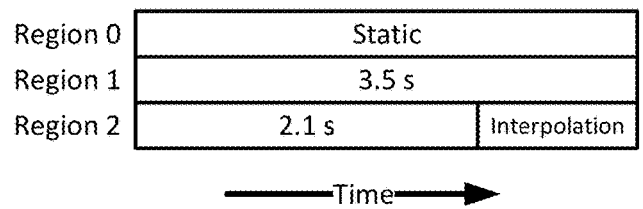
Figure 7:
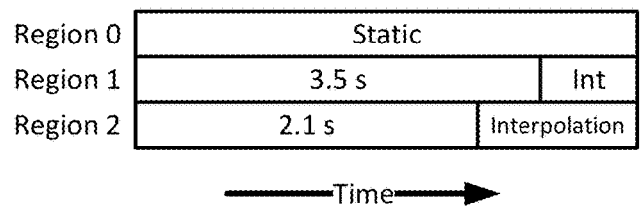
Figure 8:
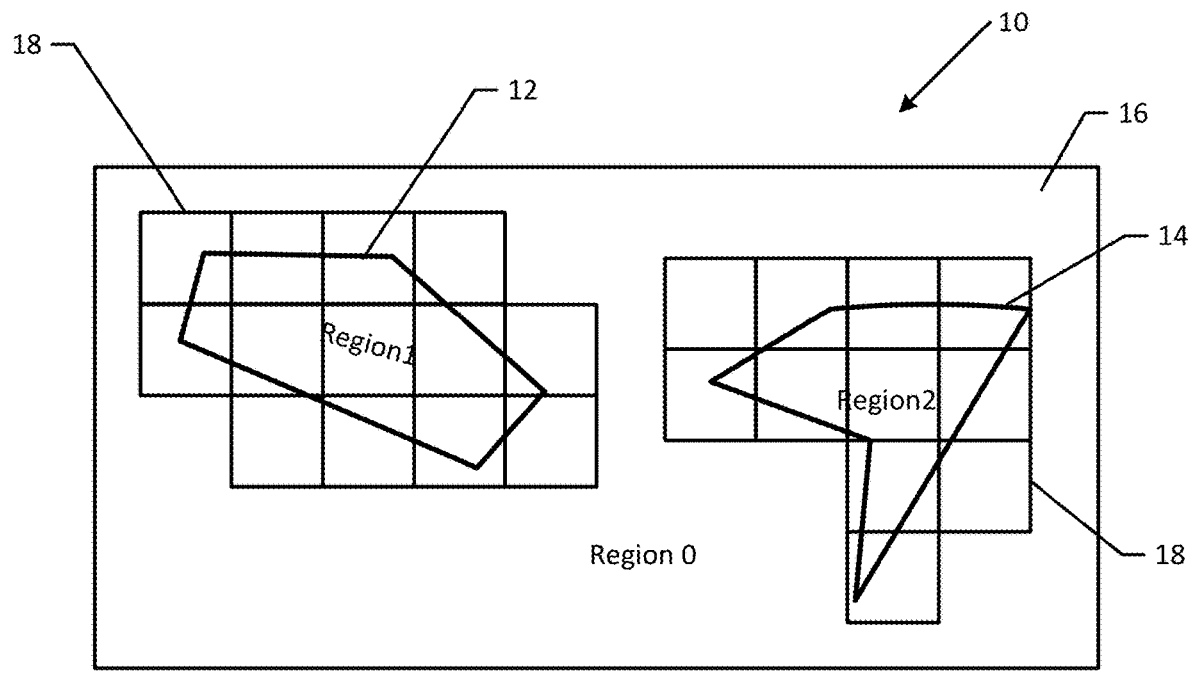
Figure 9:
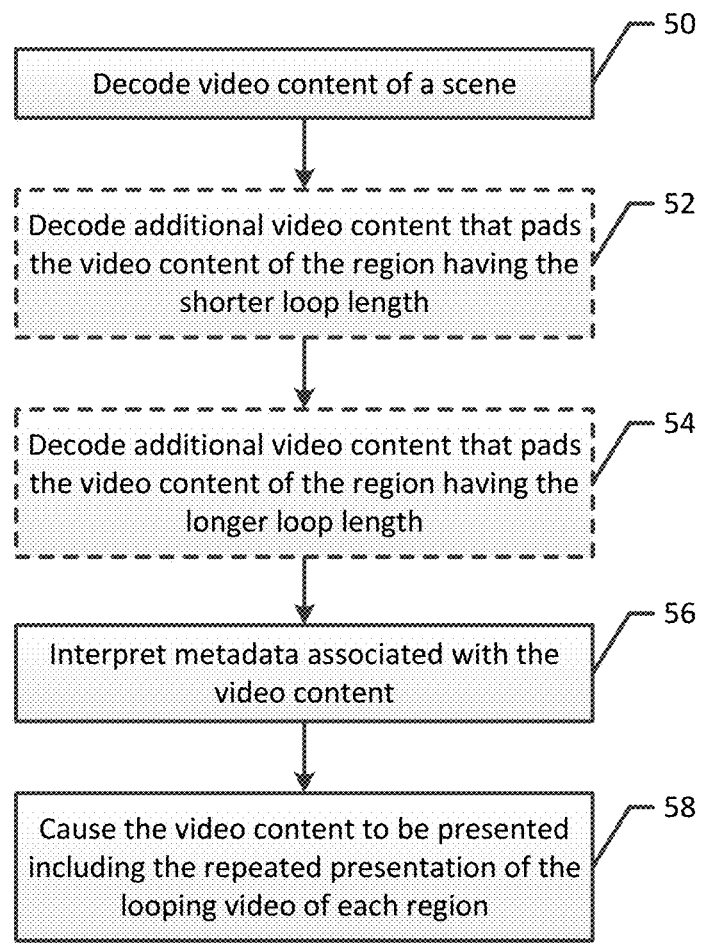
Figure 10:
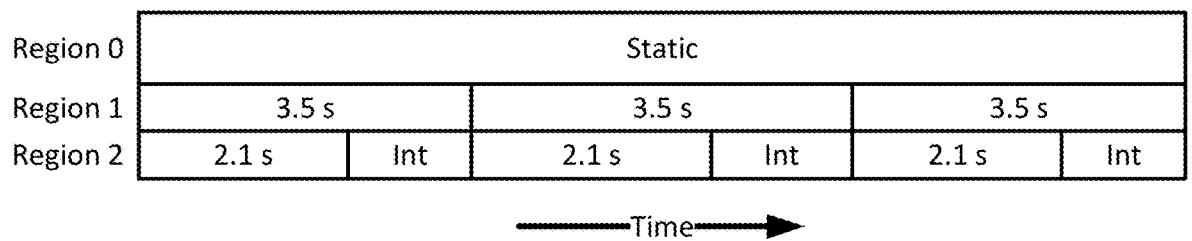
Figure 11:
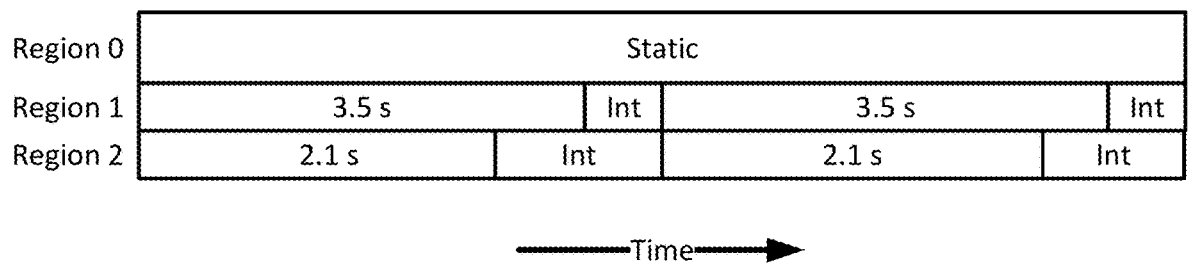

Having thus described certain example embodiments of the present disclosure in general terms, reference will now be made to the accompanying drawings, which are not necessarily drawn to scale, and wherein:

FIG. 1 is an illustration of a scene that includes two regions having looping videos with different loop lengths;

FIG. 2 is a timeline illustrating the alignment of the loop lengths of the looping videos of the different regions of FIG. 1;

FIG. 3 is a timeline illustrating the repeated misalignment of the loop lengths of the looping regions of a plurality of regions, one of which includes introductory content;

FIG. 4 is a block diagram of an apparatus configured in accordance with an example embodiment of the present disclosure;

FIG. 5 is a flowchart illustrating the encoding and provision of the video content in accordance with an example embodiment of the present disclosure;

FIG. 6 is a timeline illustrating the alignment of the looping videos of the first and second regions with the looping video of the second region being padded with video interpolation in accordance with an example embodiment of the present disclosure;

FIG. 7 is a timeline illustrating the alignment of the looping videos of the first and second regions with the looping videos of the first and second regions being differently padded with video interpolation in accordance with an example embodiment of the present disclosure;

FIG. 8 illustrates a scene including first and second regions having looping videos of different loop lengths and depicting the blocks of the scene associated with each region in accordance with an example embodiment of the present disclosure;

FIG. 9 is a flowchart illustrating the decoding and presentation of video content in accordance with an example embodiment of the present disclosure;

FIG. 10 is a timeline illustrating the repeated presentation of the looping videos of the first and second regions in which the looping video of the second region is padded with video interpolation so as to be aligned with the looping video of the first region in accordance with an example embodiment of the present disclosure; and FIG. 11 is a timeline illustrating the repeated presentation of the looping videos of the first and second regions in which the looping videos of both the first and second regions have been differently padded with respective video interpolations so as to be aligned in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to encode and/or decode video content of a scene, such as video content of a scene that will be repeatedly displayed in a loop, such as in the form of a cinemagraph. As described below, the video content of the scene includes two or more regions having looping videos of different loop lengths. Based upon the generation of the video content of the scene in the manner set forth by an example embodiment of the present disclosure, the video content of the scene may be encoded, transmitted, stored and/or decoded in an efficient manner without excessive consumption of processing resources. In this regard, the quantity of encoded data representative of the video content of the scene that will be repeatedly presented and which includes regions having looping videos of different loop lengths is managed, such as by being reduced relative to conventional approaches, such that the video content of a scene may be more efficiently encoded, transmitted, stored and/or decoded.

One example of an apparatus 20 that is configured in accordance with an example embodiment of the present disclosure is depicted in FIG. 4. As described below in conjunction with the flowchart of FIG. 5, the apparatus of an example embodiment may be configured to encode video content of a scene and to cause provision of the encoded video content, such as for transmission, storage or the like. As such, the apparatus of this example embodiment may be embodied by or otherwise associated with an encoder. In another example embodiment, the apparatus is configured in the manner set forth by the flowchart of FIG. 9 in order to decode the video content of the scene and to cause the decoded video content to be presented. In this example embodiment, the apparatus may be embodied by or otherwise associated with a decoder. In either instance, the apparatus may more generally be embodied by a computing device, such as a server, a personal computer, a computer workstation or other type of computing device including those functioning as an encoder and/or a decoder as noted above. Regardless of the manner in which the apparatus is embodied, the apparatus of an example embodiment may be configured as shown in FIG. 4 so as to include, be associated with or otherwise be in communication with processing circuitry 22 including, for example, a processor 24 and a memory 26 and, in some embodiments, a communication interface 28 and/or a user interface 30.

In the processing circuitry 22, the processor 24 (and/or co-processors or any other circuitry assisting or otherwise associated with the processor) may be in communication with the memory device 26 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multi-threading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an encoder and/or a decoder) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In embodiments that include a communication interface 28, the communication interface may be any means such as a device or circuitry embodied in either hardware or a combination of hardware and software that is configured to receive and/or transmit data from/to a network and/or any other device or module in communication with the apparatus 20, such as an encoder, a decoder, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 20 may include a user interface 30 that may, in turn, be in communication with the processing circuitry 22 to receive an indication of a user input and/or to cause presentation of the video content of the scene as decoded. As such, the user interface may include, for example, a keyboard, a mouse, a joystick, a display, a touch screen(s), touch areas, soft keys, a microphone, a speaker, or other input/output mechanisms. Alternatively or additionally, the processor 24 may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device 26, and/or the like).

The operations performed, such as by the apparatus 20 of FIG. 4, in accordance with an example embodiment in order to encode the video content of a scene and to cause provision of the encoded video content, such as for transmission, storage or the like, will now be described by way of example, but not of limitation, with respect to the flowchart of FIG. 5. As shown in block 32 of FIG. 5, the apparatus of an example embodiment includes means, such as the processing circuitry 22, the processor 24 or the like, for encoding video content of a scene. The scene may be a video, such as a large field of view video, e.g., a planar projection of a 360° video, that is to be repeatedly displayed in a loop, such as in the form of a cinemagraph. The video content of a scene includes at least two regions having looping videos of different loop lengths. The regions having looping videos may be identified in various manners. For example, the video content of the scene may be analyzed, such as by performing motion detection on the video content in order to identify regions with movement during the duration of the video content of the scene. Although various motion detection techniques to identify regions with movement may be employed, examples of such motion detection techniques include those described by Kwak, et al. in an article entitled Generalized Background Subtraction Based on Hybrid Inference by Belief Propagation and Bayesian Filtering as published in conjunction with the 2011 International Conference on Computer Vision and by Tompkin, et al. in an article entitled Towards Moment Imagery: Automatic Cinemagraphs as published in conjunction with the 2011 Conference for Visual Media Production. Another example of a motion detection technique to identify regions with movement may be to determine the optical flow and to then threshold the intensity of the flow in order to identify a region with repeated movement. Alternatively, a user may provide input identifying those regions that experience movement. In some instances, the movement associated with a region does not repeat and, as such, the loop length of the looping video of the respective region will be the same length as the length of the video content for the scene. However, in other embodiments, the movement associated with a region repeats and, as such, a loop length may be defined, such as described by an article by Liao, et al. entitled Automated Video Looping with Progressive Dynamism as published in the ACM Transactions on Graphics—SIGGRAPH 2013 Conference Proceedings, Volume 32, Issue 4, Article 77 (July 2013). For the remainder of the scene for which movement is not detected, the scene is considered to be static.

Although the video content of the scene may include any number of regions having looping videos and the regions may be positioned at any of various locations within the scene, reference is now made to FIG. 1 by way of example, but not of limitation to illustrate a scene 10 having two regions designated Region 1 and Region 2 having looping videos of different loop lengths, namely, 3.5 seconds and 2.1 seconds, respectively. The remainder of the scene, that is, the portion of the scene outside of the regions having looping videos, is also designated as a region, such as Region 0. In this example, Region 0 represents the background of the scene and is static, thereby having a loop length of 0 seconds.

In accordance with an example embodiment, the video content of the scene including the video content of the at least two regions having looping video is encoded such that only a single loop of each of the at least two regions having looping videos is encoded. Thus, in the example of FIG. 1, only a single loop of the 3.5 second looping video of Region 1 is encoded and only a single loop of the 2.1 second looping video of Region 2 is encoded regardless of the number of times that the looping video will be repeatedly presented. By encoding only a single loop of each of the at least two regions having looping videos, the quantity of data representative of the video content of the scene that is encoded is reduced relative to conventional techniques that encode a plurality of loops for the regions having looping video, thereby facilitating the encoding, transmission, storage and/or decoding of the video content in an efficient manner.

Since the looping videos of at least two regions have different loop lengths, the apparatus 20 of an example embodiment includes means, such as the processing circuitry 22, the processor 24 or the like, for padding the video content of the region having a shorter loop length with additional video content such that the aggregate loop length, that is, the sum of the loop length of the video content of the region having the shorter loop length and the length of the additional video content is at least as long as the loop length of the video content of the region having a longer loop length. See block 34 of FIG. 5. As shown in FIG. 6, for example, the apparatus of an example embodiment includes means, such as the processing circuitry, the processor or the like, for padding the video content by adding additional video content in the form of video interpolation to the video content of the region having the shorter loop length. The video interpolation may be defined in various manners. In an example embodiment, the video interpolation may be the last frame of the looping video of the region having the shorter loop length with the last frame repeated throughout the extent of the video interpolation. Alternatively, other types of video interpolation representative of the looping video for the region having the shorter loop length may be constructed including the video interpolation described in an article by Meyer, et al. entitled Phase-Based Frame Interpolation for Video as published by the IEEE Conference on Computer Vision and Pattern Recognition (Jun. 8, 2015) and by an article by Niklaus, et al. entitled Video Frame Interpolation via Adaptive Convolution as published by the IEEE Conference on Computer Vision and Pattern Recognition (2017). In the example depicted in FIG. 6, the length or extent of the padding, such as a video interpolation, is such that the aggregate loop length of the video content of the region having the shorter loop length, e.g., 2.1 seconds in this example embodiment, and the additional video content is equals the loop length of the video content region having the longer loop length, e.g., 3.5 seconds. As shown in FIG. 6, the resulting encoded video content includes encoded video content for the static background of Region 0, encoded video content of a single loop of the looping video for Region 1 and a single loop of the looping video for Region 2 in combination with the video interpolation.

In another embodiment depicted in FIG. 7, the video content of the region having the longer loop length may also be padded with additional video content, that is, the video content of both the region with the longer loop length and the region with the shorter loop length may be padded, albeit padded with different lengths of video content, such as in order to improve the quality of the subsequent presentation of the video content of the scene. In this regard, the lengths of the padding added to the looping videos of the different regions are defined such that the aggregate loop length of the video content of each region as well as the additional video content added as a result of the padding have equal lengths. In this example embodiment, the apparatus 20 includes means, such as the processing circuitry 22, the processor 24 or the like, for padding the video content of the region having the longer loop length with additional video content. For example, the apparatus of this example embodiment may include means, such as the processing circuitry, the processor or the like, for padding the video content by adding additional video content in the form of video interpolation to the video content of the region having the longer loop length. As described above, the video interpolation may be the last frame or any other predefined frame of the looping video of the respective region that is repeated throughout the duration of the padding. Alternatively, the video interpolation may be defined in a different manner, such as described by Meyer and Niklaus articles referenced above. Thus, the additional video content added to the looping video having the longer loop length is generally different than the additional video content added to the looping video having the shorter loop length. Regardless, the resulting aggregate loop lengths of the video content of each region in combination with the additional video content padded to the looping video of the respective regions are equal in length. As shown in FIG. 7, the encoded video content of the scene of an example embodiment may therefore include the encoded representation of the static background of Region 0, an encoded representation of the 3.5 second looping video and the associated video interpolation for Region 1 as well as the 2.1 second looping video and the video interpolation associated with Region 2.

As shown in block 38 of FIG. 5, in addition to encoding the video content of a scene, the apparatus 20 of an example embodiment includes means, such as the processing circuitry 22, the processor 24 or the like, for constructing metadata in association with the video content. The metadata includes information identifying a location of each region within the scene. Although the location and, in some instances, the size and shape of each region may be defined in various manners, the scene of an example embodiment may be divided into a plurality of cells. Although the cells may have various sizes and shapes, the cells of an example embodiment are all equally sized and shaped and, in the illustrated embodiment, are squares and, as such, are termed blocks. As such, the location of a region within the scene may be defined in terms of the blocks of the scene in which the region resides, either fully or partially. With reference to FIG. 8, for example, the blocks 18 of the scene 10 that are associated with and which define the location of the first and second regions 12, 14 are illustrated. Thus, the metadata may identify the blocks of the scene associated with each of the different regions in order to identify the location of each respective regions within the scene.

The metadata also includes the loop length for each of the at least two regions. With respect to the two regions 12, 14 having looping videos in the example of FIG. 8, metadata may be included that identifies the loop length of the looping video for Region 1 to be 3.5 seconds and the loop length for the looping video of Region 2 to be 2.1 seconds. In some embodiments, the metadata may also include the length of the padding, such as video interpolation, if any, associated with any one or more of the regions.

As shown in block 40 of FIG. 5, the apparatus 20 of this example embodiment also includes means, such as the processing circuitry 22, the processor 24, the memory 26, the communication interface 28 or the like, for causing the provision of the video content as encoded as well as the metadata associated therewith. The encoded video content may be provided in various manners. For example, the encoded video content may be stored, such as by memory 26 or by other memory devices, either internal or external. In this embodiment, the encoded video content that is stored may be subsequently retrieved and decoded for purposes of subsequent presentation, such as upon a display of the user interface 30. Alternatively, the encoded video content may be transmitted, such as by the communication interface 28 to a remote computing device, for decoding and presentation. Regardless of the manner in which the encoded video content is provided, the provision of the encoded video content may be more efficient and may consume fewer processing resources than conventional approaches as a result of the efficient manner in which the video content is encoded, such as by encoding only a single loop of the regions having looping video while still supporting the decoding and presentation of the video content of the scene in a repeated manner in which the video content of the scene is repeatedly presented in a loop, such as in the form of a cinemagraph.

Although the video content of the scene may be represented in various manners, one example of an embodiment of the present disclosure will hereinafter be provided in conjunction with video content that is formatted in accordance with the international standards organization (ISO) based media file format, namely ISO/IEC14496-12 (ISO base media file format (ISOBMFF)) and the file format for network abstraction layer (NAL) unit structured video, namely, ISO/IEC14496-15, which is derived from the ISOBMFF. A basic building block in the ISO base media file format is a box. Each box has a header and a payload. The box header indicates the type of box and the size of the box in terms of bytes. Two categories of boxes may be used, Box or FullBox, which differ in the structure of the box header. In the case of FullBox the box header includes a version field and a bit field known as box flags, whereas in the case of Box these syntax elements are not present in the box header. The box may include one or more other boxes and the ISO file format specifies which box types are allowed within a box of a predefined type. Furthermore, the presence of some boxes may be mandatory in each file, while the presence of other boxes may be optional. For some box types, it may be allowable to have more than one box present in a file. Thus, the ISO based media file format is considered to specify a hierarchical structure of boxes.

According to the ISO family of file formats including ISOBMFF and the file format for NAL unit structured video, a file includes media data, such as the video content of a scene, and metadata that is encapsulated into boxes. Each box is identified by a four character code (4CC) and starts with a header that indicates the type and size of the box. In files conforming to ISOBMFF, the data, such as the video content of the scene, e.g., encoded video content, may be provided in a media data (mdat) box and the metadata may be provided in a movie (moov) box. In some instances, for a file to be operable, both of the mdat and moov boxes may be required. The moov box may include one or more tracks with each track residing in a corresponding track (trak) box. A track may be one of many types including a media track that refers to samples formatted according to a media compression format (and its encapsulation to the ISOBMFF).

In ISOMBFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, that is, the edit list box, is provided below:

```
aligned(8) class EditListBox extends FullBox('elst', version, flags) {
    unsigned int(32) entry_count;
    for (i=1; i <= entry_count; i++) {
        if (version==1) {
            unsigned int(64) segment_duration;
            int(64) media_time;
        } else { // version==0
            unsigned int(32) segment_duration;
            int(32) media_time;
        }
        int(16) media_rate_integer;
        int(16) media_rate_fraction = 0;
    }
}
```

In this example of the edit list box, flags specifies the repetition of the edit list. By way of example, setting a specific bit within the box flags (e.g., the least significant bit, that is, flags & 1 in American National Standards Institute (ANSI)-C notation, wherein & indicates a bit-wise AND operation) equal to 0 specifies that the edit list is not repeated, while setting the specific bit (e.g., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) shall be equal to zero. When the edit list is repeated, the media at time 0 resulting from the edit list follows immediately the media having the largest time resulting from the edit list such that the edit list is repeated seamlessly.

In this example embodiment, the ISO base media file format may be utilized for encapsulating video content, which imposes the limitation that the regions having looping videos should be rectangular in shape. As such, in this example, rectangular bounding boxes for the regions may be formed and each rectangular region may be encoded as coded video utilizing a video codec. Further, the background may be encoded as a single rectangular coded image with a video or image codec. In this regard, the regions having looping videos, such as Region 1 and Region 2 may be blanked out or smoothed prior to encoding the background in order to obtain improved compression. The coded regions, such as Regions 0, 1 and 2 of the example embodiment, may be encapsulated as respective tracks in an ISOBMFF file with Regions 0, 1 and 2 encapsulated, for example, as tracks 0, 1 and 2, respectively. The layer parameter in the TrackHeaderBox of the ISOBMFF file may be utilized in order to order tracks 1 and 2 to be positioned in front of track 0 during playback. Also, the matrix syntax structure in the TrackHeaderBox of the ISOBMFF file may be used to locate tracks 1 and 2 in the correct spatial locations in relation to the background of track 0. Additionally, in order to repeatedly play the video content of the scene in a looping fashion such as in the form of a cinemagraph, each track may include an edit list box having a repeat flag set. Thus, the video content in the ISOBMFF file may be decoded and presented with the video content of the scene repeated in a looping fashion in the form of a cinemagraph. However, by reducing the size of the video content of the scene that is encoded, stored and/or transmitted as a result of encoding only a single loop of each of the at least two regions having looping videos, the processing resources associated with the encoding, storing, transmitting and/or decoding may be conserved.

In an embodiment, a foreground region, such as Region 1 or 2 in FIG. 8, is coded in a manner such that it contains pixels outside the region. The video of the foreground region is associated with transparency information, such as an alpha plane sequence, which may be stored in the same container file as the video of the foreground region. An alpha plane may, for example, be a monochromatic video, where color difference components may be absent or where color difference components may be constant and predefined. Pixels of the alpha plane may define how much transparency respective pixels in the foreground region have. An alpha plane sequence may be coded similarly to conventional video, and a coded alpha plane sequence may be decoded similarly to decoding conventional coded video.

Referring now to FIG. 9, the operations performed, such as by the apparatus 20 of FIG. 4 embodied by or in association with a decoder, are illustrated in order to provide for the decoding and presentation of the video content of the scene. As shown in block 50 of FIG. 9, the apparatus of this example embodiment includes means, such as the processing circuitry 22, the processor 24 or the like, for decoding video content of the scene. As noted above, the video content includes at least two regions having looping videos at different loop lengths. As also noted above, the video content of the scene as decoded includes only a single loop of each of the at least two regions having looping videos, thereby reducing the quantity of the video content that must be decoded while still providing sufficient content to permit accurate presentation of the video content of the scene, such as in a repeatedly looping fashion in the form of a cinemagraph.

In an embodiment of the type described above in conjunction with FIG. 6 and with additional video content, such as in the form of video interpolation, has been added as padding to the video content of the region having the shorter loop length, the apparatus includes means, such as the processing circuitry 22, the processor 24 or the like, for decoding the video content by also decoding the additional video content in the form of video interpolation that pads the video content of the region having the shorter loop length. See block 52 of FIG. 9. As described above and as a result of the padding provided by the additional video content, the aggregate loop length of the video content of the region having the shorter loop length and the additional video content is at least as long and, in the embodiment of FIG. 6, is equal to the loop length of the video content of the region having the longer loop length.

By way of another example and as described above in conjunction with FIG. 7 in which the video content of at least two regions having different loop length are both padded with additional video content, the apparatus 20 includes means, such as the processing circuitry 22, the processor 24 or the like, for decoding the video content by decoding the additional video content in the form of video interpolation that pads the video content of the region having the longer loop length, along with decoding the additional video content in the form of video interpolation that pads the video content of the region having a shorter loop length. See block 54 of FIG. 9. In this example embodiment and as described above, the aggregate loop length of the video content of the region having the shorter loop length and the additional video content added by padding is equal to the aggregate loop length of the video content of the region having the longer loop length and the additional video content added thereto.

As shown in block 56 of FIG. 9, the apparatus 20 of this example embodiment also includes means, such as the processing circuitry 22, the processor 24 or the like, for interpreting the metadata associated with the video content to identify information identifying the location of each region within the scene and to identify the loop length of the looping video for each of the at least two regions. In the example embodiment described above in which the location of each region is defined in terms of blocks within the scene, the apparatus, such as the processing circuitry, the processor or the like, is configured to identify the blocks of the scene that include, fully or partially, a respective region within the scene. In some embodiments, the interpretation of the metadata may also include the identification of the length of the padding, such as video interpolation, if any, associated with any one or more of the regions.

As show in block 58 of FIG. 9, the apparatus 20 of this example embodiment also includes means, such as the processing circuitry 22, the processor 24, the user interface 30 or the like, for causing the video content as decoded to be presented with each region positioned within the scene at the location identified by the metadata. In this regard, the video content as decoded to be presented within each region, such as the looping video of each region, is positioned within the scene at the location identified by the metadata. The apparatus, such as the processing circuitry, the processor, the user interface or the like, is also configured to present the video content as decoded in such a manner that the looping video of each region is caused to be repeatedly presented even though the video content that is decoded includes only a single loop of the regions having the looping videos.

The presentation of the decoded video content may take various forms. As shown in FIG. 10, for example, the static background provided by Region 0 may be consistently presented, while the looping videos of Regions 1 and 2 are also repeatedly presented, albeit with different loop lengths that are only occasionally, if ever, aligned. In the example depicted by FIG. 2, the looping videos for Regions 1 and 2 are repeatedly presented with no delay or filler between the looping videos. Even though the video content of the scene is encoded so as to include only a single loop of the looping videos for Regions 1 and 2, the looping videos for Regions 1 and 2 are repeatedly presented. In embodiments in which the video content that is decoded includes additional video content associated with the video content region having the shorter loop length and, optionally, the video content of the region having the longer loop length, the video interpolation that pads the video content need not be presented, thereby resulting in a presentation as shown in FIG. 2.

In an embodiment in which video interpolation is included in the video content to pad the video content of the region having the shorter loop length, the additional video content in the form of a video interpolation need not be presented. However, in some embodiments, such as those in which a legacy decoder is deployed that is not configured to interpret the metadata defining the loop lengths, the additional video content may be repeatedly presented following the presentation of the video content of the region having the shorter loop length as shown in FIG. 10. As such, alignment is maintained in this example embodiment between the looping video of the region having the longer loop length, that is, Region 1, and the looping video of the region having the shorter loop length, that is, Region 2. As shown in this example embodiment, the additional video content in the form of video interpolation that pads the video content of Region 2 may be repeated along with the video content of Region 2 such that the looping videos for Regions 1 and 2 are repeatedly presented in an aligned manner. In an embodiment in which the video content also includes additional video content in the form of video interpolation, not only for the looping video of the region have the shorter loop length as described above in conjunction with FIG. 10, but also for the looping video of the region having the longer loop length, that is, Region 1, the additional video content for both regions need not be presented. However, in some embodiments, such as those in which a legacy decoder is deployed that is not configured to interpret the metadata defining the loop lengths, the additional video content associated with the looping videos of the regions having both the shorter and longer loop lengths may also be decoded and repeatedly presented in such a manner that the additional video content in the form of video interpolation is repeatedly presented following the looping video of Region 1, thereby again maintaining alignment between the looping videos of the different regions as shown in FIG. 11. In addition to repeatedly presenting the looping videos of the regions within the scene, the video content of the scene itself may be repeatedly presented in a loop in the form of a cinemagraph.

By relying upon video content that includes only a single loop of the regions having looping videos, the quantity of the video content that is received and must be decoded in order to support the presentation of the video content of the scene may be reduced relative to the video content produced by conventional approaches, thereby increasing the efficiency of the coding, transmission, decoding and/or presentation and conserving the corresponding processing resources that support those various operations. Moreover, the manner in which the video content of the scene is encoded and subsequently decoded provides for the presentation of the video content of the scene in a repeatedly looping manner that is both natural and preserves the quality of the video content by avoiding unnatural gaps or other discontinuities in the resulting presentation of the video content.

As described above, FIGS. 5 and 9 illustrate flowcharts of an apparatus 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks in flowcharts of FIGS. 5 and 9 that are outlined with a dashed line. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although video content of a scene including two regions having looping videos is depicted and described above, the video content of the scene may include different numbers of regions having looping videos with the loop lengths of some or all of the regions being different from one another. As another example, although the background, e.g., Region 0, is described to be static, the background may also be represented by a looping video in other embodiments. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    encoding video content of a scene, wherein the video content includes at least two regions encapsulated as respective tracks and having looping videos of different loop lengths, wherein encoding video content comprises encoding fewer loops of the looping video of a respective region than a number of times that the looping video will be presented and including an edit list box with a repeat flag set for video content that includes the looping videos, a duration of said respective tracks being longer than said different loop lengths;
    constructing metadata in association with the video content, wherein the metadata comprises information identifying a location of each of the at least two regions within the scene, wherein said different loop lengths are signaled in the metadata, wherein the metadata further comprises a loop length for each of the at least two regions, wherein said metadata comprises one or more edit lists, the one or more edit lists providing a mapping between a presentation timeline of said respective tracks and a media timeline of said respective tracks, wherein said one or more edit lists provide for linear offset for presentation of samples in respective tracks, wherein respective durations of said one or more edit lists are indicated in the edit list box, and wherein the loop length for said at least one of the respective tracks is equal to a sum of the duration of said one or more edit lists; and
    causing provision of the video content, as encoded, and the metadata,
    wherein said repeat flag is operable to indicate that respective looping videos should be repeated in accordance with said metadata.

2. A method according to claim 1 further comprising padding a first video content associated with a first region of the at least two regions of the video content with an additional video content such that an aggregate loop length of the first video content and the additional video content is at least as long as a loop length of a second video content of a second region of the at least two regions of the video content, wherein a loop length of the first video content is shorter than the loop length of the second video content.

3. A method according to claim 2 wherein padding the first video content comprises adding additional video content in a form of video interpolation to the first video content of the first region having the shorter loop length, said video interpolation comprising any predefined frame of said first video content.

4. A method according to claim 1 wherein encoding video content comprises encoding only a single loop of each of the at least two regions having looping videos.

5. A method according to claim 1 further comprising padding a second video content associated with a second region of the at least two regions of the video content with an additional video content, wherein a loop length of the second video content is longer than a loop length of a first video content of a first region of the at least two regions of the video content.

6. A method according to claim 5 wherein padding the second video content comprises adding additional video content in a form of video interpolation to the second video content of the second region having the longer loop length, said video interpolation comprising any predefined frame of said second video content.

7. The method of claim 1 further comprising:
    encoding image content of the scene, wherein the image content includes a background of the scene, encoded as a single rectangular coded image.

8. The method of claim 7 further comprising:
    blanking out the at least two regions in the background of the scene before encoding the background as the single rectangular coded image.

9. The method of claim 1 wherein the looping videos of the at least two regions are associated with an alpha plane sequence that defines a transparency of the looping videos.

10. An apparatus comprising at least one processor and at least one memory including computer program code, the at least one memory and computer program code configured to, with the processor, cause the apparatus to at least:
    encode video content of a scene, wherein the video content includes at least two regions encapsulated as respective tracks and having looping videos of different loop lengths, wherein encoding video content comprises encoding fewer loops of the looping video of a respective region than a number of times that the looping video will be presented and including an edit list box with a repeat flag set for video content that includes the looping videos, a duration of said respective tracks being longer than said different loop lengths;
    construct metadata in association with the video content, wherein the metadata comprises information identifying a location of each of the at least two regions within the scene, wherein said different loop lengths are signaled in the metadata, wherein the metadata further comprises a loop length for each of the at least two regions, wherein said metadata comprises one or more edit lists, the one or more edit lists providing a mapping between a presentation timeline of said respective tracks and a media timeline of said respective tracks, wherein said one or more edit lists provide for linear offset for presentation of samples in respective tracks, wherein respective durations of said one or more edit lists are indicated in the edit list box, and wherein the loop length for said at least one of the respective tracks is equal to a sum of the duration of said one or more edit lists; and cause provision of the video content, as encoded, and the metadata, wherein said repeat flag is operable to indicate that respective looping videos should be repeated in accordance with said metadata.

11. An apparatus according to claim 10 wherein the at least one memory and computer program code are further configured to, with the processor, cause the apparatus to pad a first video content associated with a first region of the at least two regions of the video content with an additional video content such that an aggregate loop length of the first video content and the additional video content is at least as long as a loop length of a second video content of a second region of the at least two regions of the video content, wherein a loop length of the first video content is shorter than the loop length of the second video content.

12. An apparatus according to claim 11 wherein the at least one memory and computer program code are configured to, with the processor, cause the apparatus to pad the first video content by adding additional video content in a form of video interpolation to the first video content of the first region having the shorter loop length, said video interpolation comprising any predefined frame of said first video content.

13. An apparatus according to claim 10 wherein the at least one memory and computer program code are configured to, with the processor, cause the apparatus to encode video content by encoding only a single loop of each of the at least two regions having looping videos.

14. An apparatus according to claim 10 wherein the at least one memory and computer program code are further configured to, with the processor, cause the apparatus to pad a second video content associated with a second region of the at least two regions of the video content with an additional video content, wherein a loop length of the second video content is longer than a loop length of a first video content of a first region of the at least two regions of the video content.

15. An apparatus according to claim 14 wherein the at least one memory and computer program code are configured to, with the processor, cause the apparatus to pad the second video content by adding additional video content in a form of video interpolation to the second video content of the second region having the longer loop length, said video interpolation comprising any predefined frame of said second video content.

16. A method comprising:
decoding video content of a scene, wherein the video content includes at least two regions encapsulated as respective tracks and having looping videos of different loop lengths, and wherein decoding the video content comprises decoding the looping videos and identifying an edit list box with a repeat flag that is set, a duration of said respective tracks being longer than said different loop lengths;

interpreting metadata associated with the video content to identify information identifying a location of each region within the scene and identifying the loop length of the looping video for each of the at least two regions, wherein said different loop lengths are signaled in the metadata, wherein said metadata comprises one or more edit lists, the one or more edit lists providing a mapping between a presentation timeline of said respective tracks and a media timeline of said respective tracks, wherein said one or more edit lists provide for linear offset for presentation of samples in respective tracks, wherein respective durations of said one or more edit lists are indicated in the edit list box, and wherein the loop length for said at least one of the respective tracks is equal to a sum of the duration of said one or more edit lists; and causing the video content as decoded to be presented with each region positioned within the scene at the location identified by the metadata, wherein causing the video content to be presented comprises causing the looping video of each region to be repeatedly presented based upon the looping video that was decoded, wherein decoding the looping video comprises decoding fewer loops of the looping video of a respective region than the number of times that the looping video is presented, wherein said repeat flag is operable to indicate that the looping videos should be repeated in accordance with said metadata.

17. A method according to claim 16 wherein decoding video content comprises decoding additional video content in a form of video interpolation that pads a first video content of a first region of the at least two regions of the video content such that an aggregate loop length of the first video content and the additional video content is at least as long as a loop length of a second video content of a region of the at least two regions of the video content, wherein a loop length of the first video content is shorter than the loop length of the second video content, and wherein causing the video content to be presented further comprises causing a combination of the looping video of the first region having the shorter loop length and the additional video content to be repeatedly presented, said video interpolation comprising any predefined frame of said first video content.

18. A method according to claim 16 wherein the video content comprises only a single loop of each of the at least two regions having looping videos.

19. A method according to claim 16 wherein decoding video content comprises decoding additional video content in a form of video interpolation that pads a second video content of a second region of the at least two regions of the video content, wherein a loop length of the second video content is longer than a loop length of a first video content of a first region of the at least two regions of the video content, and wherein causing the video content to be presented further comprises causing a combination of the looping video of the second region having the longer loop length and the additional video content to be repeatedly presented, said video interpolation comprising any predefined frame of said second video content.

20. The method of claim 16 wherein the video content further includes a background of the scene, encoded as a single rectangular coded image.

21. The method of claim 20 wherein the background further comprises at least two respective regions associated with the at least two regions encapsulated as respective tracks, the at least two respective regions being blanked out prior to the background being encoded as the single rectangular coded image.

22. The method of claim 21 further comprising:
causing decoding of the background from the video content of the scene;

causing the background as decoded from the single rectangular coded image having the at least two respective regions of the background blanked out, to be presented as a static image; and causing the video content as decoded to be presented with each region of the at least two regions being positioned, according to the metadata, at the associated one or more respective regions of the background of the scene, wherein causing the video content to be presented comprises causing the looping video of each region to be repeatedly presented based upon the looping video that was decoded.

23. An apparatus comprising at least one processor and at least one memory including computer program code, the at least one memory and computer program code configured to, with the processor, cause the apparatus to at least:

decode video content of a scene, wherein the video content includes at least two regions encapsulated as respective tracks and having looping videos of different loop lengths, and wherein decoding the video content comprises decoding the looping videos and identifying an edit list box with a repeat flag that is set, a duration of said respective tracks being longer than said different loop lengths;

interpret metadata associated with the video content to identify information identifying a location of each region within the scene and identify the loop length of the looping video for each of the at least two regions, wherein said different loop lengths are signaled in the metadata, wherein said metadata comprises one or more edit lists, the one or more edit lists providing a mapping between a presentation timeline of said respective tracks and a media timeline of said respective tracks, wherein said one or more edit lists provide for linear offset for presentation of samples in respective tracks, wherein respective durations of said one or more edit lists are indicated in the edit list box, and wherein the loop length for said at least one of the respective tracks is equal to a sum of the duration of said one or more edit lists; and cause the video content as decoded to be presented with each region positioned within the scene at the location identified by the metadata, wherein causing the video content to be presented comprises causing the looping video of each region to be repeatedly presented based upon the looping video that was decoded, wherein decoding the looping video comprises decoding fewer loops of the looping video of a respective region than the number of times that the looping video is presented, wherein said repeat flag is operable to indicate that the looping videos should be repeated in accordance with said metadata.

24. An apparatus according to claim 23 wherein the at least one memory and computer program code are configured to, with the processor, cause the apparatus to decode video content by decoding additional video content in a form of video interpolation that pads a first video content of a first region of the at least two regions of the video content such that an aggregate loop length of the first video content and the additional video content is at least as long as a loop length of a second video content of a region of the at least two regions of the video content, wherein a loop length of the first video content is shorter than the loop length of the second video content, and wherein the at least one memory and computer program code are configured to, with the processor, cause the apparatus to cause the video content to be presented by causing a combination of the looping video of the first region having the shorter loop length and the additional video content to be repeatedly presented, said video interpolation comprising any predefined frame of said first video content.

25. An apparatus according to claim 23 wherein the video content comprises only a single loop of each of the at least two regions having looping videos.

26. An apparatus according to claim 23 wherein the at least one memory and computer program code are configured to, with the processor, cause the apparatus to decode video content by decoding additional video content in a form of video interpolation that pads a second video content of a second region of the at least two regions of the video content, wherein a loop length of the second video content is longer than a loop length of a first video content of a first region of the at least two regions of the video content, and wherein the at least one memory and computer program code are configured to, with the processor, cause the apparatus to cause the video content to be presented by causing a combination of the looping video of the second region having the longer loop length and the additional video content to be repeatedly presented, said video interpolation comprising any predefined frame of said second video content.

* * * * *